United States Patent [19]
Impastato

[11] Patent Number: 5,454,243
[45] Date of Patent: Oct. 3, 1995

[54] TRAILER LOCKING SYSTEM

[76] Inventor: Frank Impastato, 6201 Airline Hwy., Metairie, La. 70003

[21] Appl. No.: 122,002

[22] Filed: Sep. 14, 1993

[51] Int. Cl.$^6$ ................................................ B60R 25/00
[52] U.S. Cl. ................................. 70/228; 70/226; 188/2 R
[58] Field of Search .......................... 70/225, 226, 228, 70/211, 212; 188/2 R

[56] References Cited

U.S. PATENT DOCUMENTS

| | | | |
|---|---|---|---|
| 391,241 | 10/1888 | Gongware et al. | 70/228 |
| 470,836 | 3/1892 | Hall | 70/228 |
| 565,537 | 8/1896 | Gunderson | 70/228 |
| 565,658 | 8/1896 | Akers | 70/228 |
| 602,397 | 4/1898 | Grass | 70/228 |
| 2,149,761 | 3/1939 | Coats | 70/228 |
| 3,713,668 | 1/1973 | Flindt | 280/150 R |
| 3,845,844 | 11/1974 | Woerner | 188/32 |
| 4,804,070 | 2/1989 | Bohler | 70/225 X |

FOREIGN PATENT DOCUMENTS 13103   3/1910   Denmark ................................. 70/228

Primary Examiner—Lloyd A. Gall
Attorney, Agent, or Firm—Joseph T. Regard

[57] ABSTRACT

A trailer locking system configured to be utilized with a variety of wheeled vehicles. The preferred embodiment of the present invention teaches a system configured to be utilized in conjunction with a boat, vehicle, or utility trailer, the system contemplating a locking member configured to be easily installed to most such trailers. In operation, the locking member of the present invention is pivoted relative the trailer frame, until a gripping member physically engages with a tire on the trailer, to the point of preventing rotation of the tire, thereby preventing theft of the trailer. Further, the tire engaged by the gripping member is immobilized so as to prevent removal of same, while the locking member itself is secured to the trailer in such a manner as to prevent undesired removal.

4 Claims, 1 Drawing Sheet

TRAILER LOCKING SYSTEM

BACKGROUND OF THE INVENTION

Invention Field

The present invention relates to vehicle locks, and in particular to a trailer locking system configured to be utilized with a variety of wheeled vehicles. The preferred embodiment of the present invention teaches a system configured to be utilized in conjunction with a boat, vehicle, or utility trailer, the system contemplating a locking member configured to be easily installed to most such trailers.

In operation, the locking member of the present invention is pivoted relative the trailer frame, until a gripping member physically engages with a tire on the trailer, to the point of preventing rotation of the tire, thereby preventing theft of the trailer. Further, the tire engaged by the gripping member is immobilized so as to prevent removal of same, while the locking member itself is secured to the trailer in such a manner as to prevent undesired removal.

The present invention provides an effective, easily implemented, and relatively inexpensive system for immobilizing a variety of towed trailers in a manner which requires little maintenance.

General Background Discussion

A trailered boat, personal watercraft, or like item typically represents an easy target for theft, and while industrious individuals have been able to immobilize their trailer wheels utilizing chains or the like, little has been provided in the way of effective, easily installed, and relatively inexpensive trailer locks.

Trailers often include a slot for accepting a padlock incorporated into the trailer tongue for preventing engagement of a trailer hitch ball into same, but this system offers little resistance to thieves, who can easily cut the look, or steal the trailer by lashing the tongue to their vehicle, and towing it to a remote location.

The present invention teaches the utilization of a pivotal friction member which engages with the trailer wheel, preventing rotation of same. While the inventor knows of no patents teaching such a concept in conjunction with trailers or the like, there are some patents for other uses which may be considered of some general pertinence.

A listing of patents which may be considered as being of general interest are as follows:

| Patent Number | Inventor(s) | Date of Issue |
| --- | --- | --- |
| 391,241 | Gongware, Hanley | 10/16/1888 |
| 3,713,668 | Flindt | 01/30/1973 |
| 565,658 | Akers | 08/11/1896 |
| 565,537 | Gunderson | 08/11/1896 |
| 470,836 | Hall | 03/15/1892 |

A review of the above patents indicates various bike locks, brakes, and the like configured to prevent the rotation of a tire, frictionally locking the tire in place and preventing removal or theft thereof.

For example, U.S. Pat. No. 391,241 teaches a "Lock for Bicycles", wherein there is taught a tire engaging member pivotally connected to the bike frame for preventing rotation of the tire when engaged. U.S. Pat. No. 470,836 teaches an apparatus having similar operating characteristics to '241.

U.S. Pat. No. 3,713,668 teaches a lock system specifically designed for trailers and the like, wherein an obstruction is placed between the spokes of the wheel, a readily distinguishable locking system from that contemplated in the present invention.

Summary Discussion of the Invention

Unlike the prior art, the present invention teaches a trailer locking system for preventing the theft of a variety of trailers, which is effective in operation, relatively easily installed, and relatively inexpensive to implement.

The present invention contemplates a trailer looking system whereby there is contemplated a base member configured to be installed to a variety of trailer configurations, a locking member including a friction bar at one end for engagement to the trailer wheel, a initiation handle extending from the other end of the locking member, and a pivot piece for pivotally connecting the base member to the locking member. The locking system further includes a number of aligned locking apertures formed in both the base and locking members, for allowing the passage of a hardened pad lock or the like for immobilizing the locking member into position.

The preferred embodiment of the present invention is configured to utilization in conjunction with boat and personal watercraft trailers, or utility trailers or the like. As configured, the locking system of the present invention is configured to immobilize the locked wheel in place, preventing removal of same. Additionally, the present system is installed as to prevent removal of the base member from the trailer by unauthorized parties.

It is therefore an object of the present invention to provide a trailer look system for immobilizing the wheel of a variety of trailer configurations.

It is another object of the present invention to provide a trailer lock system which is easily installed and implemented, and effective in operation.

It is another object of the present invention to provide a trailer lock system which is adjustable for accommodating a variety of sized tires.

Lastly, it is an object of the present invention to provide a trailer lock system which is unable to be removed by unauthorized individuals once installed.

BRIEF DESCRIPTION OF THE DRAWINGS

For a further understanding of the nature and objects of the present invention, reference should be had to the following detailed description, taken in conjunction with the accompanying drawings, in which like parts are given like reference numerals, and wherein.

DETAILED DESCRIPTION of the INVENTION

Figure 1:
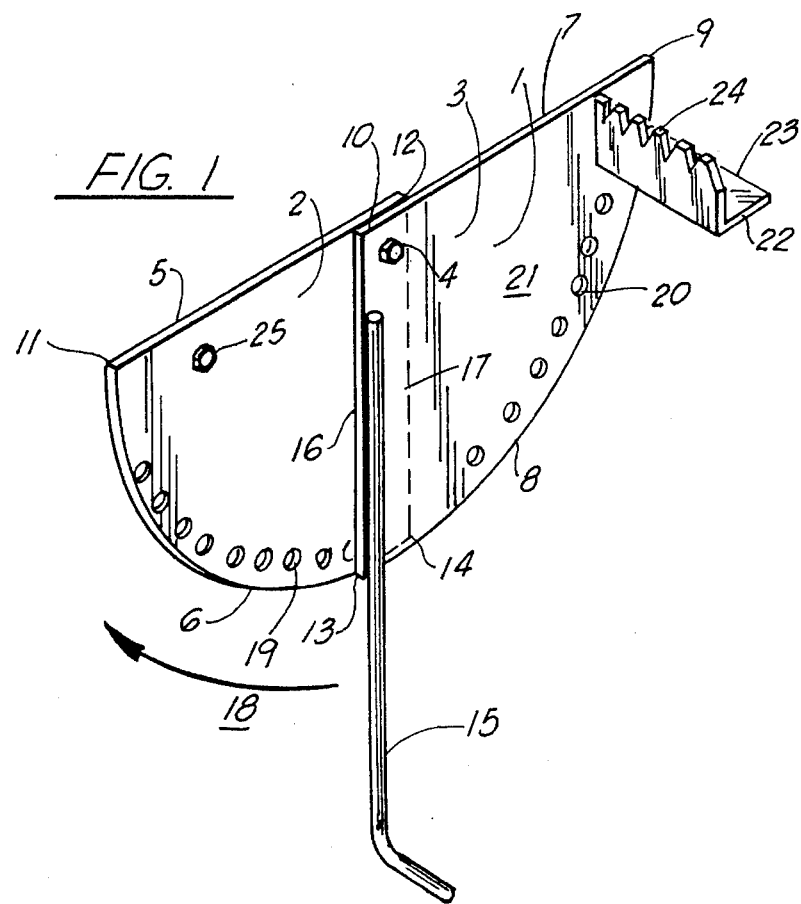
FIG. 1 illustrates an isometric view of the trailer lock system of the present invention, illustrating the various parts and components of the trailer lock and its operation.

As shown, the trailer lock 1 of the present invention comprises a base member 2 pivotally connected in face-to-face arrangement to a looking member 3 via a pivotal bolt 4 arrangement or the like. As shown, the base member 2 and locking member 3 each have a first linear edge 5, 7, a second linear edge 17, 16 intersecting at their respective first ends 12, 10 at about a 90° angle with the first linear edge, and a third, curved edge 6, 8 intersecting with the second ends 11, 9 and 14, 13 of the first 5,7 and second 17, 16, linear edges, forming second and third ends, respectively. A initiation bar 15 is affixed along the second linear edge 16 of the looking member 3 so as to emanate past the curved edge 8 of the locking member, allowing the user to forcefully pivot 18 the looking member as desired.

As further shown in FIG. 1, both the base member 2 and locking member 3 include along their respective curved edges 6, 8 a plurality of spaced locking apertures 19, 20 configured so as to allow their alignment at various positions for the passage of a padlock or holding bar therethrough.

Emanating in lateral fashion from the outer face 21 of the locking member 3, near the second end 9 of the first linear edge 7 and the curved edge 8 is friction piece 22, including toothed friction bar 24 generally aligned with the second linear edge 16 of the locking member 3, said friction bar 24 supported and strengthened by a lateral support member 23.

Figure 2:
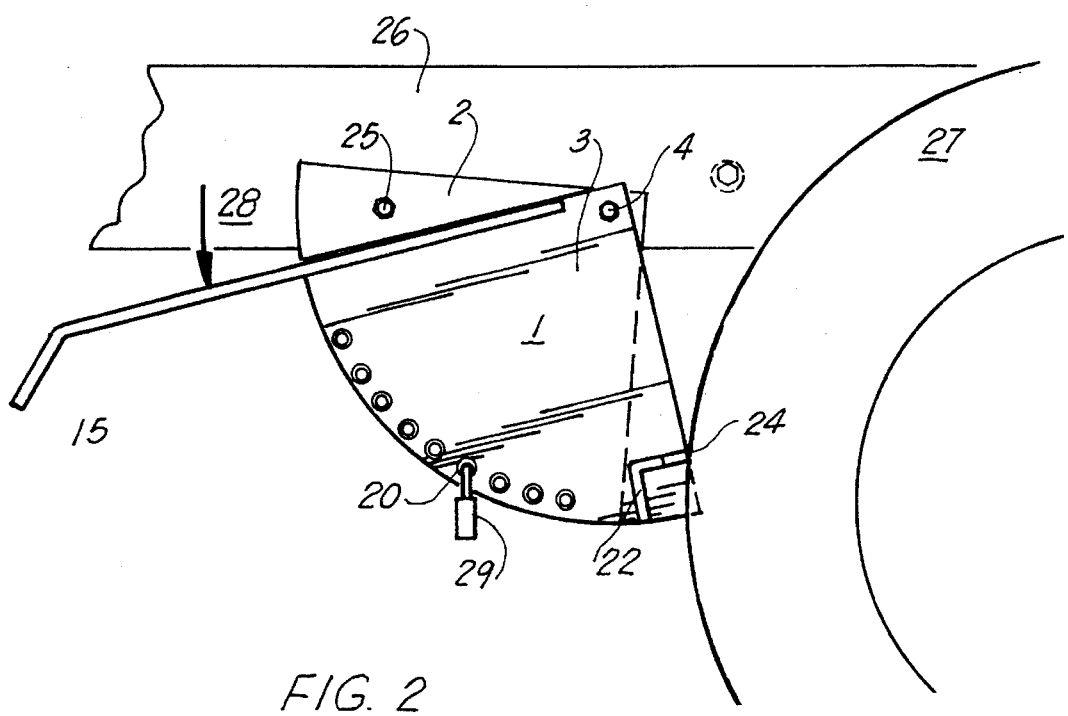
FIG. 2 illustrates a frontal view of the trailer lock system of FIG. 1, illustrating the trailer lock installed to a trailer, and its operation relative same.

As illustrated in FIG. 2, the trailer lock 1 of the present system is configured to be installed upon a trailer 26, and be utilized to immobilize the trailer wheel 27. The base member 2 is configured to be affixed to the trailer frame via threaded nut and bolt arrangement 25 or the like.

As shown, the locking member 3 pivots 28 from a storage position, wherein the initiation bar 15 is situated in a somewhat horizontal position in general longitudinal alignment with the trailer 26 frame, and held in place via lock or locking bar through the aligned aperture holes of the base and locking member, to a locking position, wherein the toothed friction bar 24 is applied against the trailer tire 27, and pressure is applied by pulling the initiation bar 15 downward 28 frictionally immobilizing the tire 27. The locking member is then held in place by aligning the locking apertures of the base member 2 and locking member 3, and applying a locking bar or padlock 29 therethrough.

In use, the base member 2 is affixed to the frame (preferably via locked or keyed lugs, although the unit may be welded to the trailer) of the trailer in the vicinity of one of the trailer wheels, initiation bar is urged upward, pivoting the locking member 3 into the storage position wherein the initiation bar 15 is in generally horizontal position, wherein at least one of the locking apertures (19), 20 are aligned, and a locking bar, padlock, or the like is inserted within one of the aligned apertures, holding the system in open, trailer transportable condition.

When it is desired that the trailer be immobilized, the user merely removes the locking bar, padlock or the like from the locking apertures, and urges the initiation bar 15 downward, pivoting the locking member 3 until the toothed friction bar 24 contacts the tread face of the tire 27. Additional downward pressure is applied to the initiation bar, causing the toothed friction bar 24 to press against the tire, and the locking bar, padlock, or the like is inserted through one of the aligned apertures, holding the tire in a locked, immobilized condition.

Should a thief then try to steal the trailer, the locked tire would fail to rotate, preventing moving of the trailer for any significant distance. Further, the pressure applied against the tire by the present trailer lock I prevents removal of the wheel even if the wheel lugs were able to be removed, although locking or keyed lug nuts are recommended.

The invention embodiments herein described are done so in detail for exemplary purposes only, and may be subject to many different variations in design, structure, application and operation methodology. Thus, the detailed disclosures therein should be interpreted in an illustrative, exemplary manner, and not in a limited sense.

What is claimed is:

1. A trailer locking system for locking a trailer having a frame and a wheel, comprising:

a base member having a first, generally linear edge having first and second ends, a second, generally linear edge having first and second ends, said first and second edges intersecting one another at said first end of said first and second edges, respectively, in generally perpendicular fashion, forming a first base end, and a generally curved outer edge medially situated relative to and intersecting with said second ends of said first and second linear edges, forming second and third base ends, respectively;

a locking member having a first linear edge having first and second ends, a second generally linear edge having first and second ends, said first and second linear edges intersecting one another at said first ends of said first and second edges, in generally perpendicular fashion, forming a first locking member end, and a generally curved outer edge medially displaced relative to and intersecting with said second ends of said first and second, linear edges, forming second and third locking member ends, respectively;

pivot means for pivotally joining said locking member first end to said first base end of said base member, in face to face arrangement;

an initiation bar emanating from the vicinity of said locking member third end, said initiation bar aligned with said second edge of said locking member; and a friction piece emanating in lateral fashion from said locking member generally near said second locking member end, said friction piece including a friction bar.

2. The trailer locking system of claim 1, wherein said friction bar is toothed.

3. The trailer locking system of claim 2, wherein said friction bar is strengthened by a lateral support member.

4. The trailer locking system of claim 1, wherein said base member and said locking member have formed therein a plurality of spaced locking apertures, configured so as to allow alignment of at least one of said apertures of said locking member and said base member at various pivotal positions.

* * * * *